(12) United States Patent
Murtza et al.

(10) Patent No.: US 7,089,325 B1
(45) Date of Patent: Aug. 8, 2006

(54) METHOD AND APPARATUS FOR URL FORWARDING

(75) Inventors: Shamoun Murtza, Hackensack, NJ (US); Daniel Hillel Cohen, Brooklyn, NY (US); Adam D. Burstein, Brooklyn, NY (US)

(73) Assignee: Register.com, Inc., New York, NY (US)

( * ) Notice: Subject to any disclaimer, the term of this patent is extended or adjusted under 35 U.S.C. 154(b) by 584 days.

(21) Appl. No.: 09/610,580

(22) Filed: Jul. 5, 2000

(51) Int. Cl.
*G06F 15/173* (2006.01)
*G06F 15/16* (2006.01)
*G06F 15/177* (2006.01)

(52) U.S. Cl. ............... 709/242; 709/203; 709/217; 709/227; 709/245

(58) Field of Classification Search ............ 709/202, 709/203, 218, 219, 226, 228, 245, 224, 242, 709/217, 227; 370/352
See application file for complete search history.

(56) References Cited

U.S. PATENT DOCUMENTS

| | | | | | |
|---|---|---|---|---|---|
| 5,751,956 | A | * | 5/1998 | Kirsch | 709/203 |
| 5,905,862 | A | * | 5/1999 | Hoekstra | 709/202 |
| 6,092,100 | A | * | 7/2000 | Berstis et al. | 709/203 |
| 6,104,711 | A | * | 8/2000 | Voit | 370/352 |
| 6,112,276 | A | * | 8/2000 | Hunt et al. | 711/112 |
| 6,125,395 | A | * | 9/2000 | Rosenberg et al. | 709/228 |
| 6,161,124 | A | * | 12/2000 | Takagawa et al. | 709/203 |
| 6,189,030 | B1 | * | 2/2001 | Kirsch et al. | 709/224 |
| 6,195,691 | B1 | * | 2/2001 | Brown | 709/219 |
| 6,298,341 | B1 | * | 10/2001 | Mann et al. | 707/3 |
| 6,321,242 | B1 | * | 11/2001 | Fogg et al. | 715/513 |
| 6,338,082 | B1 | * | 1/2002 | Schneider | 709/203 |
| 6,408,296 | B1 | * | 6/2002 | Acharya et al. | 707/10 |
| 6,412,014 | B1 | * | 6/2002 | Ryan | 709/245 |

(Continued)

OTHER PUBLICATIONS

Harry Newton. Newton Telecom Dictionary. 2002. CMP Books. 18th Edition. p. 236-237.*

*Primary Examiner*—Christopher Revak
*Assistant Examiner*—Christian LaForgia
(74) *Attorney, Agent, or Firm*—Hogan & Hartson L.L.P.

(57) ABSTRACT

A domain name is associated with the IP address of a first, URL forwarding web server within the domain name system (DNS) so that a request for a website or other resource associated with the domain name is presented to the URL forwarding web server. The URL forwarding web server accesses a file stored on a file server and determining from the contents of the file the IP address to which the domain name should resolve. The file associated with that domain name may contain information that initiates display of static or dynamic content from the URL forwarding web server. Alternately, the file may contain instructions to associate the requested domain name with the IP address of a second, destination web server that has the requested content or resource. Most preferably, the URL forwarding web server performs this access to the file server directly, without executing a script or other interface program supplementary to the URL forwarding web server. For example, the URL forwarding web server may include a module that receives a domain name, accesses the file from the file server and evaluates the contents of the file. When the file includes an IP address to which the domain name should resolve, preferred implementations of the module recognize the presence of the IP address within the file and return the IP address of the destination web server to the browser through which the user made the request.

25 Claims, 4 Drawing Sheets

U.S. PATENT DOCUMENTS 6,427,170 B1 * 7/2002 Sitaraman et al. .......... 709/226
6,442,602 B1 * 8/2002 Choudhry ................... 709/218
6,449,657 B1 * 9/2002 Stanbach et al. ........... 709/245
6,519,589 B1 * 2/2003 Mann et al. .................... 707/3
6,560,634 B1 * 5/2003 Broadhurst ................. 709/203
6,606,653 B1 * 8/2003 Ackermann et al. ........ 709/219
6,724,406 B1 * 4/2004 Kelley ........................ 715/804
6,826,624 B1 * 11/2004 Fell, Jr. ...................... 709/245

* cited by examiner

METHOD AND APPARATUS FOR URL FORWARDING

BACKGROUND OF THE INVENTION

1. Field of the Invention

The present invention relates generally to the Internet and more specifically to a method and apparatus for associating domain names or URLs with Internet protocol (IP) addresses and directing domain or URL requests to a desired IP address.

2. Description of the Related Art

Each computer on the Internet is identified by a unique Internet protocol ("IP") address. This address is a 32-bit number organized as four 8-bit values separated by periods such as 123.45.67.89. Such a numerical system, while useful as a routing address system for computer-to-computer communication, is not human user-friendly. Consequently, domain names are used to allow users to more easily identify and connect to a target computer on the network. These user-friendly domain names (or "host names"), such as "register.com", are easy for users to remember and, since they map to a unique IP number, accurately identify the computer's IP address. In such a domain name identification scheme, the domain name forms a part of the uniform resource locator (URL) that specifies the location of resources on the World Wide Web. The URL identifies the mechanism used to access the resource (e.g., http, ftp, etc.), the specific computer that houses the resource, and the specific name of the resource (such as a filename).

As with the underlying Internet address, domain names typically have a hierarchical organization, with the trailing portion of the domain name, such as .com, .net, .org, us, .uk or .jp, representing the top-level domain. Top-level domains include global top-level domains (gTLD) and country specific or country code top-level domains (ccTLD). The global top-level domains include .com, .org, .net, .edu, .gov and .mil. Of these, .edu, .gov and mil gTLD's are restricted to use by entities meeting specific qualifications. Country code top-level domains are country specific in that they identify registrations within a given country. The specific country governs registration for the country code top-level domains. Some countries are "open" in that they allow any entity to register a domain name within its ccTLD. Other countries are "closed" and only allow entities that meet restrictions such as residency to register domain names in that ccTLD. Most domain users presently use one or more of the .com, .net or org gTLDs.

The domain name entered by a user is sent over the Internet to a global network of servers called the "domain name system" (DNS), which receives the domain name as a request and translates the domain name into the target computer's numerical IP address. The numerical IP address is returned to the user's computer to enable it to connect to the target computer. Typically, after the user enters the domain name, the rest of the process is invisible to the user until the user connects to the target computer. The domain name system consists of a collection of root servers or DNS Servers that provide a directory linking domain names with corresponding IP addresses. There are presently thirteen root servers worldwide that contain authoritative databases listing all top-level domains. The collection of root servers is centrally managed for all global top-level domains to ensure that each computer on the network can be uniquely identified by unique domain names and numerical addresses.

A "registry" is an international organization or entity that is responsible for assigning domain names and Internet protocol addresses. Each country maintains its own registry, generally through a company or organization. The registry has the responsibility to record and update domain names and Internet protocol addresses, as well as the information associated with them, on the root servers. A registry is under contract from its respective government to control domain name registration. The registry may authorize other entities, known here as registrars, to conduct domain name registration and other aspects of the management of domain names and IP addresses.

A "registrar" is an organization or company that is authorized to provide registration services for all users of certain top-level domains, such as the net, .org and .com global top-level domains. Registrars are presently authorized either by ICANN, the Internet Corporation for Assigned Names & Numbers, a U.S. governmental organization under the Department of Commerce, or by the registrar's respective government to control domain name registration. A registrar is authorized by the registry to act as an agent to process domain name registration. The registrar has the responsibility to create and maintain a Whois database and zone files for its customers. Examples of registrars presently include Register.com and Network Solutions, Inc., both authorized by ICANN.

A "registrant" is the individual or organization to whom a specific domain name is registered with the registry. Once a registrant has registered a domain name, paid the associated fees and met certain conditions, the individual or organization holds the domain name for use for a specific period of time. The registrant can use the domain name for such purposes as web hosting and e-mail. In many cases, the registrant may incorporate one or more domain names into an organizational identity or business. As such, a registration to use a particular domain name can be viewed as a significant asset for certain registrants.

The "shared registry system" (SRS) is a system that permits multiple registrars to provide registration services for the .com, .net and org domains. The system is a shared database that holds information about domain names and their authoritative name servers. The shared registry system updates the root servers with information about the domain names within the .com, org and .net gTLDs about every twenty-four hours in typical operation. The SRS allows accredited registrars to enter information about newly registered domain names into the SRS, and the information about the newly registered domain names is then uploaded to the root servers. Accredited registrars can update name server information within the SRS for domain names for which they are recognized as registrar. Accredited registrars are registered with the SRS and access the SRS through a secure and authenticated communication channel, such as through a secure socket level encrypted communication link. The SRS facilitates the updating of domain name and IP address information and also provides a utility for identifying the registrar that registered a domain name, when the entry to the SRS was created and the authoritative name servers for the domain name.

SUMMARY OF THE PREFERRED EMBODIMENTS

An aspect of the present invention provides a URL processing system having a first web server, a file server and a second web server. The first web server is adapted to receive a request for a first URL and return a message associated with the first URL request. The file server is associated with and accessible by the first web server, the file server adapted to store a plurality of files corresponding to a plurality of URLs associated with a plurality of IP addresses. A first file is associated with the first URL and contains a first IP address of a first destination server, the first web server returning the first IP address as part of the message in response to the first URL request. The second web server is associated with the file server and is adapted to receive a request to alter the first IP address within the first file to alter the association between the first URL and the first IP address of the first destination server.

BRIEF DESCRIPTION OF THE DRAWINGS

The embodiments and advantages of the present invention can be better understood in conjunction with the various drawings, which form a part of the disclosure of the present invention.

DETAILED DESCRIPTION OF THE PREFERRED EMBODIMENTS

Figure 1:
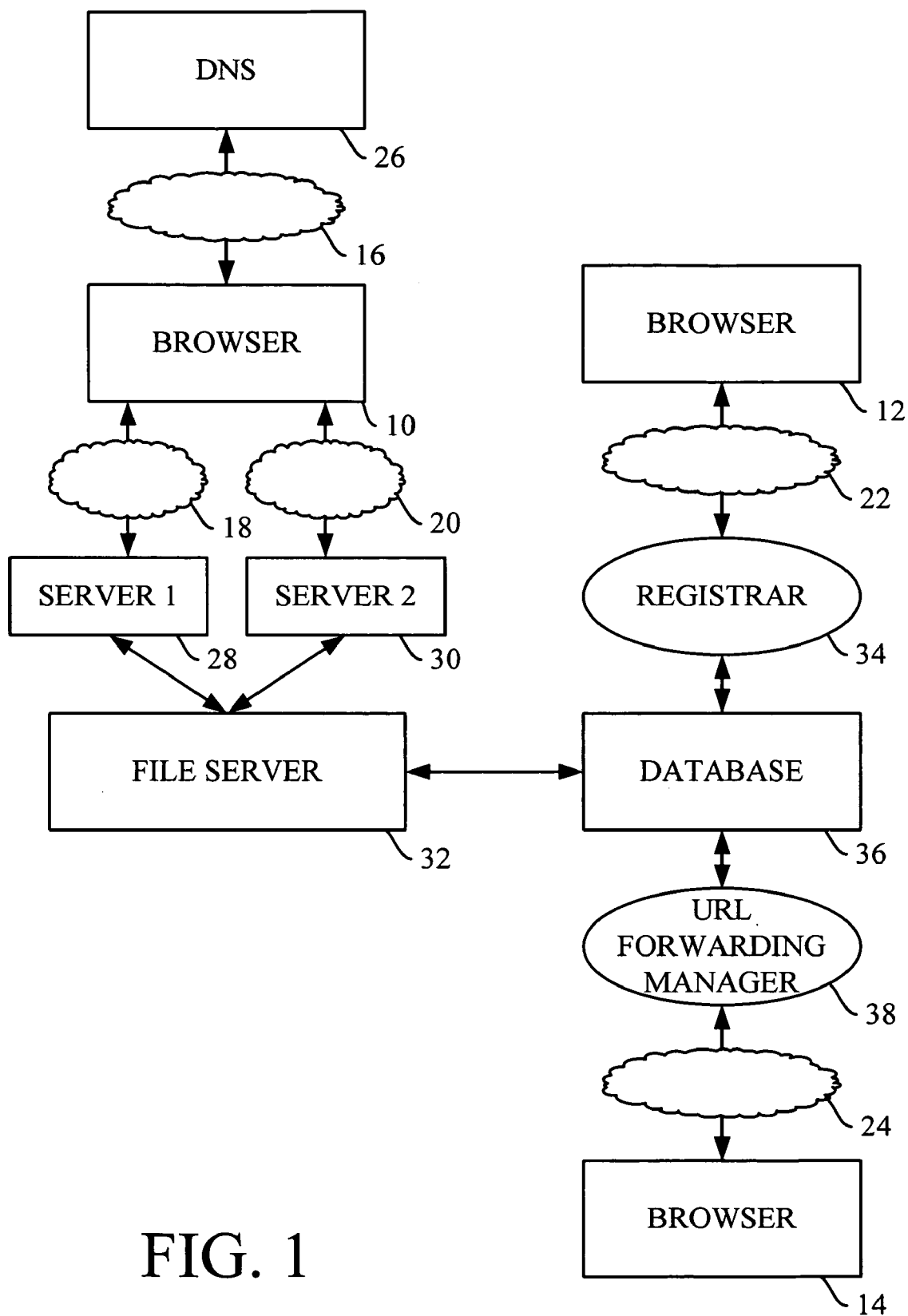
FIG. 1 illustrates schematically certain aspects of architecture for a preferred implementation of the present invention.

Preferred embodiments of the present invention provide a method or apparatus for associating an IP address with a domain name and for readily altering the association between the domain name and the IP address. In accordance with an embodiment of the present invention, a domain name is associated with a first web server within the domain name system (DNS) so that a request for a website or other resource associated with the domain name is presented to the first web server. The first web server accesses a file server to evaluate the requested domain name by accessing a file stored on the file server and determining from the contents of the file the IP address to which the domain name should resolve. The file associated with that domain name may contain information that initiates display of static or dynamic content from the first web server. Alternately, the file may contain instructions to associate the requested domain name with the IP address of a second web server that has the requested content or resource. Most preferably, the first web server performs this access to the file server directly, without executing a script or other interface program supplementary to the first web server. For example, the first web server may include a module that receives a domain name, accesses the file from the file server and evaluates the contents of the file. When the file includes an IP address to which the domain name should resolve, preferred implementations of the module recognize the presence of the IP address within the file and return the IP address of the second web server to the browser through which the user made the request. The browser can then use the returned IP address to access desired content from the destination web server.

Note here that the association between the domain name and the second, destination web server is maintained within a file server associated with the first, URL forwarding web server. This allows a domain name registrant or other URL user to readily alter the association between the domain name and an IP address without accessing the domain name system. In fact, two different associations exist: a first association between the domain name and a first IP address within the domain name system and a second association between the domain name and a second IP address. The first IP address is the address of the URL forwarding web server and the second IP address is the IP address of the second web server that stores the content associated with the domain name or URL. Preferably, the association between the URL and the IP address is maintained in a file within a file server that is directly accessed by the URL forwarding web server. By associating a domain name with the IP address of a destination server within a file stored on a file server accessed directly by the URL forwarding web server, the URL forwarding function is performed quickly and efficiently. This architecture facilitates the easy initial association of a domain name with the IP address of a destination server that serves the content for that domain name and easy updating of the IP address associated with the domain name as the domain name registrant changes destination servers.

Many companies seek to define their corporate identity at least in part in conjunction with one or more Internet domain names. This is true whether or not the company's business is conducted largely over the Internet. Building a brand identity in conjunction with a domain name makes a domain name registration valuable. When a company is successful in building the recognition of a domain name, it is important to maintain the domain name and to use that domain name as an important identifier for the company on the Internet.

A company may initially provide its website on a low capacity server to take advantage of the lower cost and lower maintenance required by websites hosted in this manner. As the traffic to the company's website increases and the performance requirements for the website increase, higher capacity, higher performance servers are needed to accommodate the traffic and provide the desired performance. Evolving requirements cause companies to move through a succession of different website hosting options. For example, a company's initial website might consist of a modest home page hosted by an Internet service provider (ISP). A successor, higher traffic website might be hosted by a more substantial website hosting service. Eventually, the company might provide its own high traffic, high performance server or servers for its website. As a practical matter, a company may use many different website hosting options over the course of time in response to not only the performance concerns discussed above, but also to other concerns such as reliability and cost.

Each different server is likely to be addressed through a different IP address. For the company's domain name to resolve to the correct IP address, the company's domain name needs to be properly associated with the server or servers that hosts the company's website. To do this, the association between the domain name and the host server's IP address is recorded in the domain name system (DNS) or in a system that is accessed through the DNS. The importance of maintaining a consistent domain name identity makes it important that this association be made quickly and reliably. Unfortunately, this is not necessarily a task easily performed by those that are not expert in servers and the Internet or by those that do not have access to the resources and capabilities of a registrar. Aspects of the present invention are provided to facilitate one or more aspects of the process of properly associating a domain name or URL with a desired server at a defined IP address. In this way, a company can maintain a consistent identity and appearance on the Internet, despite changing the physical and Internet location of the servers that host the company's website or are associated with the company's domain name or names.

Preferred embodiments of the present invention provide implementations of a URL forwarding service that allows a URL to be mapped to an IP address simply and efficiently. This mapping is performed outside of the DNS so that the associations between the domain name and the IP address to which the domain name resolves can be altered easily. To be satisfactory, a URL forwarding service generally should be unobtrusive in that the forwarding or remapping operation should occur quickly, preferably with little noticeable delay in the user accessing the website being served the requested content. Consequently, it is desirable for a URL forwarding facility or method in accordance with the present invention to provide a prompt response to a URL request for content associated with a domain name.

One way in which a URL forwarding web server might be configured is through a relational database, such as an Oracle or similar database relating domain names to IP addresses. In such a configuration, a domain name is presented to a web server that accesses the relational database to retrieve the IP address corresponding to the domain name. To accomplish this, the web server receives the domain name and runs a common gateway interface (CGI) or script to interrogate the database, determines whether the domain name is to be redirected to a second, destination web server, and provides information to the web server in response to the request. The provided information might include the IP address of the second, destination server. While this configuration of URL forwarding web server is acceptable for a low volume application, this configuration has limited speed and does not scale well. As such, a more efficient and faster implementation of a URL forwarding server is preferred in accordance with the present invention.

FIG. 1 schematically illustrates an architecture that might be used in an embodiment of the present invention. Requests and other communications are made to the URL forwarding system from conventional web browsers 10, 12 and 14. FIG. 1 shows three different browsers provided in the system, but these three different browsers could represent three different instances of the same browser. More practically, the browser 10 is likely to correspond to a visitor to a company's website, for example a customer of the company, and the browsers 12 and 14 are likely to represent a technical contact or other person associated with the company that maintains the company's websites and domain names. As the browsers 12 and 14 represent different ways of establishing and modifying the URL data stored within the file server, browsers 12 and 14 most likely represent different instances of a browser. In other regards, the illustrated browsers are conventional and each of the browsers 10, 12 and 14 preferably access the FIG. 1 system over Internet connections 16, 18, 20, 22, 24. It should be recognized that much of the functionality accessed through the browsers 12 and 14 could be accessed through a more direct interface with the FIG. 1 system. Additionally, while the present discussion is provided with reference to the Internet, it should be appreciated that the various teachings herein are generally applicable to other communications networks that use similar addressing protocols.

The browser 10 issues a request, incorporating a URL, for a resource or content to the Internet 16, and this request is forwarded to one of the domain name servers of the domain name system (DNS) 26. To illustrate aspects of the invention, this discussion assumes that the domain name or URL within the request issued by browser 10 is for a website or company that is using one of the services provided by the system of FIG. 1. For such domain names or URLs, the DNS 26 returns to the browser 10 the IP address of the web servers 28, 30 shown in FIG. 1. The illustrated web servers are illustrated as comprising two different software web servers within two different hardware or physical servers. Those of ordinary skill in the art will recognize that such a configuration provides a higher traffic capacity and more uniform loading, as well as redundancy that facilitates higher reliability. In addition to the illustrated web servers, it is preferred that the servers 28, 30 include or operate in conjunction with a load balancing solution such as the Local Director products sold by Cisco Systems, Inc. In accordance with a particularly preferred embodiment, the web servers 28, 30 are software web servers that can be customized by writing modules within the customizable web server's API. A preferred web server might, for example, be an HTTP/1.1 compliant web server such as that provided by the Apache HTTP Server Project of the Apache Software Foundation, which presently can be found at and downloaded from http:/// that organization's web site. This open-sourced web server software is particularly preferred for its speed, readily available programming facilities and support, and its widespread acceptance and availability. The presently preferred Apache servers 28, 30 are modified in accordance with the present invention to include a module to handle the URL processing described here.

On receipt of the URL, the module within the web servers 28, 30 looks in the directory tree of the file server 32 and retrieves the file associated with the URL request. For example, the URL request may comprise a domain name, the file name is most preferably made the same as the domain name and the directory structure may list the files, and hence the domain names, alphabetically. This allows the module to quickly identify and retrieve a file from the file server 32 for a particular domain name. Most preferably, the file server provides high speed access to a large shared space of disk storage and may, for example, be a file server specifically adapted for serving data such as the file servers sold by Network Appliance, Inc. Of course, with the evolution of technology, different file serving technology possibly not using disk drives will come into use. Aspects of the present invention are expected to benefit from such future technology.

If a file does not exist on the file server 32 corresponding to the URL presented by the browser 10, then the module within the web servers 28, 30 returns a message to the browser 10 that the website is unavailable or that the website will be coming soon for that URL. Generally this message will be in the form of a single, static web page. Providing this sort of response allows a company to register its domain name and establish its URLs before actually completing construction of its websites. This gives an early stage company an opportunity to begin establishing an Internet presence and identity before it is even ready to launch a website.

It should be noted that files of zero length will be ignored within the file server and the file server 32 will erase records or files within the file server 32 by overwriting the files with length zero files. Consequently, the module is preferably programmed to ignore zero length files.

If a file exists on the file server 32 corresponding to the URL, the module in the web servers will read the file to determine what services are associated with that URL. For example, the file may indicate that the URL is associated with a limited, generally static web page stored on the file servers 28, 30 or on an associated web or file server. If that is the case, the module will cause that content to be returned to the browser 10.

The file might alternately indicate that URL forwarding is provided for that URL and return a message including at least an IP address through the web servers 28, 30 to the browser 10. Other information might also be provided to the browser. For example, if the URL forwarding web site wished to provide a free URL forwarding service by providing advertising, the web servers 28, 30 might return a framed web page, with the desired advertising information or other message provided on a peripheral part of the served, framed web page. Most preferably, the desired advertising or other information is provided in the frame such that the information has to be displayed on the user's display so long as the destination server content is displayed. Preferably the additional information is provided from a source other than the shared space on the file server 32. When such a framed URL forwarding message is returned, the web servers 28, 30 cause the content from the destination server identified by the IP address retrieved from the file identified by the URL to be served onto the framed web page.

In other instances, the file on the file server 32 identified by the URL received by the web servers 28, 30 might indicate that the URL's registrant has a higher level of URL forwarding service where the registrant or company pays for the service and the URL forwarding service is more transparent to the user of browser 10. In such a case the module within the web servers 28, 30 detects the type of service to be provided from the information in the file retrieved from the file server 32 for that URL. The module provides the IP address information from the file server 32 through the web server 28 or 30 and to the browser 10. This allows the domain name to be easily resolved into a desired IP address in a manner that allows a domain name to be associated with different servers or different IP addresses in a fairly simple manner.

This discussion now illustrates how a domain name registrant elects to use the URL forwarding service illustrated in FIG. 1 and how the files within file server 32 are modified to reflect changes in the IP address to which the registrant's domain name should resolve. Preferred embodiments of the present invention might be used within a comprehensive domain name registration and domain management facility such as that described in U.S. patent application Ser. No. 09/560,433, filed Apr. 27, 2000 and entitled "Domain Manager and Method of Use," and Ser. No. 09/587,403, filed Jun. 5, 2000 and entitled Domain Manager for Plural Domains and Method of Use." These two pending U.S. patent applications are hereby incorporated by reference in their entirety and specifically for their teachings regarding interfaces through which a registrant enters information about a domain name including the information typically included in a Whois file and account information such as credit card numbers. The "registrar" web server 34 indicated in FIG. 1 provides these types of facilities. In addition, these applications are incorporated by reference for their illustration of the information stored within a database such as the preferred Oracle database 36 illustrated in FIG. 1.

The registrar web server 34 is a facility used by individuals or organizations to register domain names and to manage various aspects of an Internet domain. Generally, the web server 34 collects all of the information associated with a domain name and the domain name registrant. This information is all stored in the preferred Oracle database 36. As discussed in the above-incorporated patent applications, registrar web server uses Perl or CGI programs or any of a number of different scripting languages to access and maintain the database 36. Other information is preferably also collected and also stored within the database 36. For example, the web server preferably collects information about different services the registrant wishes to use to facilitate domain management. Preferably, one of the options provided by the registrar web server 34 is URL forwarding. For example, the registrant might be accessing the registrar web server 34 from the browser 12. In such a case, a particular domain name will be active in the browser 12. The registrant, or the technical contact or other agent for the registrant, can simply select the URL forwarding functionality from a hyperlink displayed on the browser 12. The registrar web server 34 functions to collect the additional information necessary to set up the URL forwarding functionality, including the initial IP address to which the domain name should resolve.

Figure 2A:
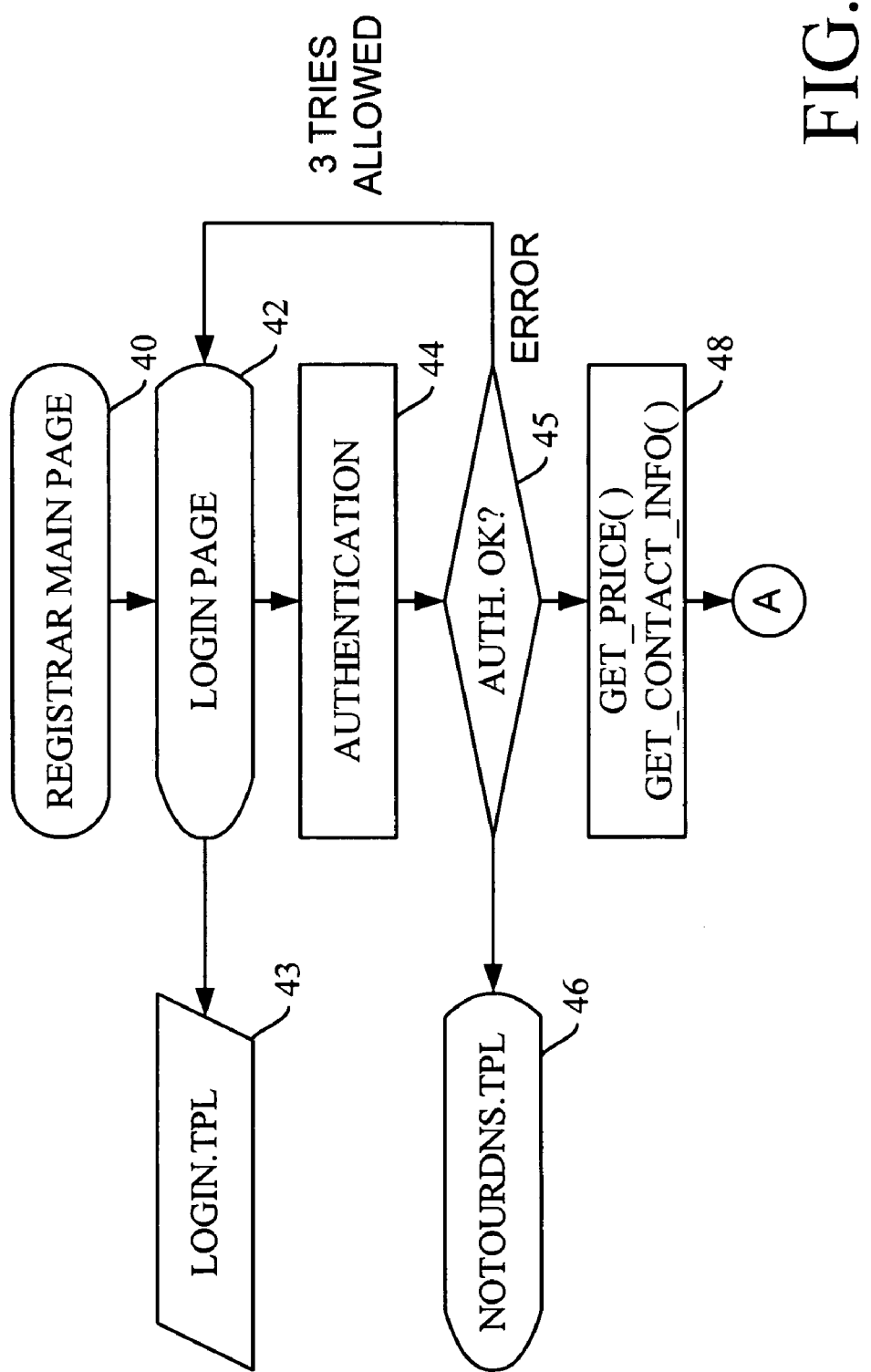
FIGS. 2(A) and 2(B) illustrate aspects of the process flow used in setting up URL forwarding in accordance with an implementation of aspects of the present invention.
Figure 2B:
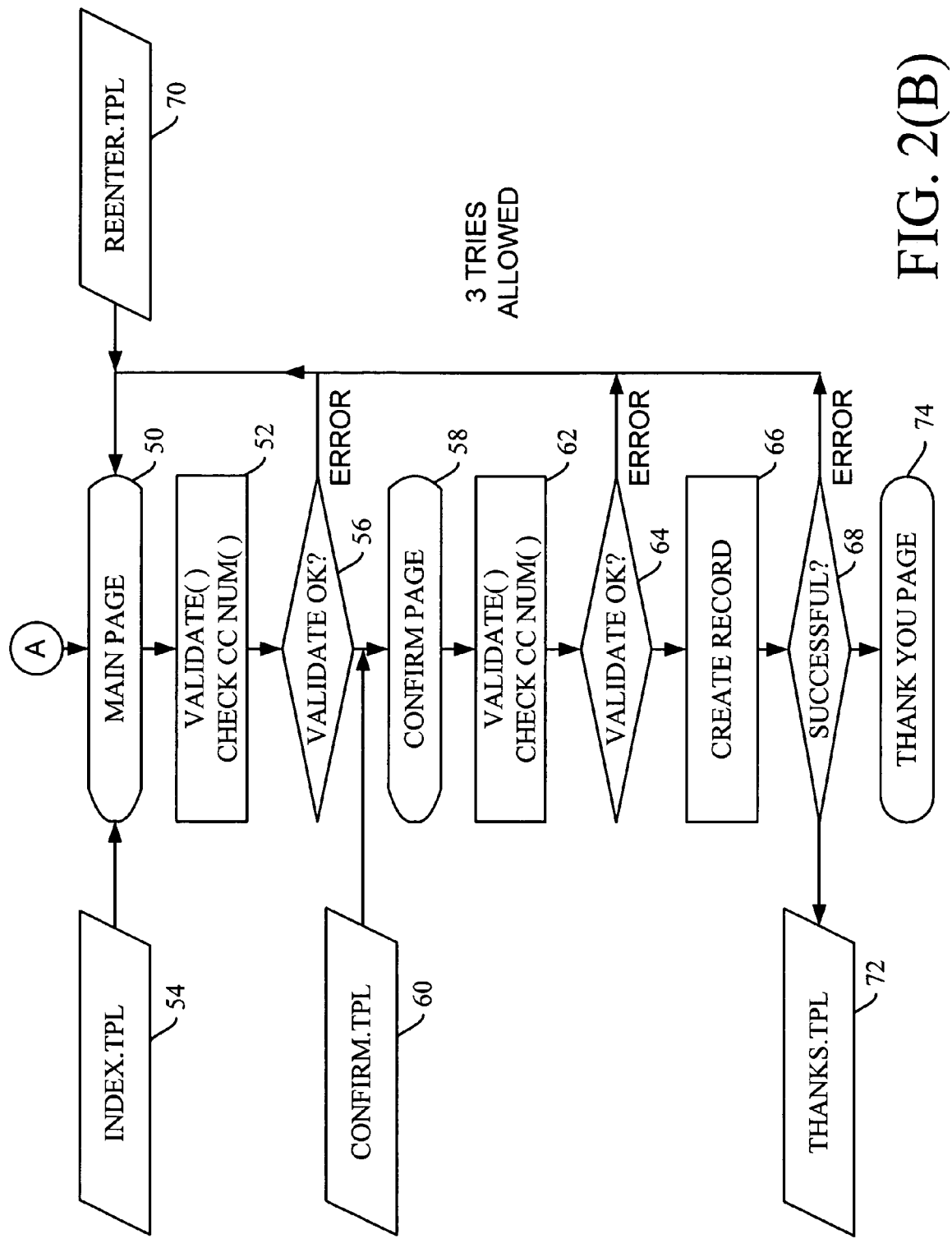

FIGS. 2(A) and 2(B) illustrate generally certain of the processes that might be employed in setting up URL forwarding, beginning from the main page 40 of the registrar web server. The processed may include requesting 42 a user to log in, preferably by accessing a login template 43. The process authenticates 44, 45 the user's rights to modify rights associated with the domain name. Although FIG. 2(A) shows a template 46 for indicating that the domain name is not registered through the registrar, this is not a requirement for providing URL forwarding services. This is merely a matter of convenience and simplicity. The process may include various housekeeping steps such as getting 48 pricing information for the URL forwarding functions from the database 36 and getting the contact information associated with the domain name or other URL to be forwarded. After the main page 50 of the URL forwarding setup, the web server 34 validates 52 the credit card number provided by the registrant. The main page 50 may access an index template 54 to facilitate gathering or display of contact information. After the user's authority is validated 56, information is collected for the URL forwarding function. Instructions are assembled and confirmed 58, for example with reference to a confirmation template 60. The user's authority and financial information may be revalidated 62, 64. Eventually, the URL forwarding record 66 is created, success is confirmed 68, a thank you template 72 is referenced to generate a thank you page 74 and the sequence of FIG. 2 is exited. The record 66 is written within the file stored to the file server 32. In the event of errors in the processes of FIG. 2(B), the user is redirected to the main page 50, with reference to a reentry template 70 as appropriate.

When the information needed for the file is prepared, the database 36 accesses a stored procedure and mounts the directory of the file server 32. The stored procedure from database 36 then writes to the file server 32 an appropriate file including the desired information specifying the services to be provided and the IP address to which the URL should resolve.

Other database 36 stored procedures can be used to perform maintenance on the file server 32. For example, files for expired URL forwarding services can automatically be deleted by overwriting the files with length zero (blank) files after the expiration of their services. A different stored procedure might periodically delete empty files and defragment the disks of the file server 32.

The FIG. 1 system preferably includes at least one mechanism for establishing a URL forwarding function and for altering the URL mapping once the URL forwarding is arranged. If URL forwarding is not set up through the registrar web server 34, the FIG. 1 system preferably allows URL forwarding to be set up through a URL forwarding web server 38. If no registrar web server 34 is provided within the FIG. 1 system, then a URL forwarding web server 38 is preferably provided that is capable of initially collecting the information associated with a registrant and a domain name. In this regard, the URL forwarding web server 38 shares significant functionality with the registrar web server 34.

Figure 3:
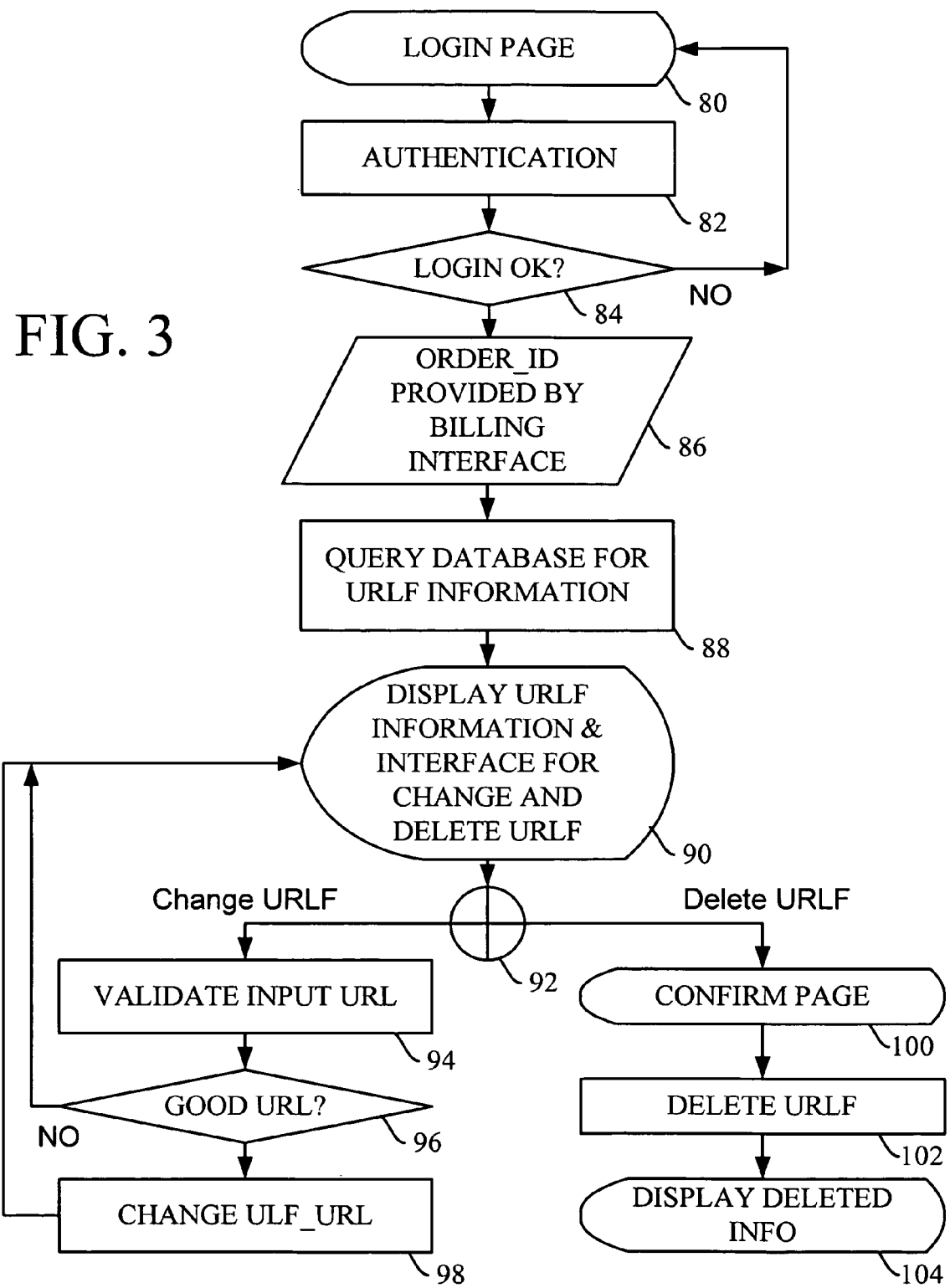
FIG. 3 illustrates an exemplary process that might be used in an implementation of aspects of the present invention for modifying previously stored URL forwarding information.

The URL forwarding web server 38 is preferably used to modify the IP address to which a URL resolves or to modify any of the other information within the files stored on the file server 32. A possible process flow for the URL modifying aspects of the server 38 is illustrated in FIG. 3, which is generally self-explanatory. Once a user is logged in 80, 84 and the user's rights are authenticated 82, internal accounting information is passed 86 between the server 38 and the database 36. The present status of the URL forwarding function, including the information within the corresponding file on the file server 32, is obtained 88 and presented 90 on an interface to a user. This interface may query the user as to whether the user wants to modify or to delete the URL forwarding functionality. Depending on the option selected 92 by the user, the FIG. 3 process will proceed along the left hand path or the right hand path. The user chooses the left hand path to modify URL forwarding information by collecting a new forwarding URL, checking the validity of the URL 94, 96 and executing a change forwarding URL function 98. The user chooses the right hand path to delete a URL forwarding instruction, using a series of processes including confirming 100 the deletion instruction, deleting 102 the URL forwarding information from the file server 32 and displaying 104 the successful completion of the operation. The outcome or either path will cause the information in the file on the file server 32 to be altered following verification that the user wants the requested change implemented.

The illustrated process, and variations on the illustrated process, allow the IP address associated with a given URL to be modified in a prompt fashion. Because the DNS will continue to reference the URL to the IP address of the web servers 28, 30, this method effectively changes the URL to IP address mapping without accessing the DNS. Moreover, the preferred Apache web servers and file server architecture provide an efficient, high speed system that makes the use of URL forwarding both convenient and practical as generally being acceptable to customers from a performance point of view.

While aspects and certain advantages of the present invention have been described herein with reference to certain preferred embodiments of the present invention, it should be appreciated that the present invention is not limited to the particular embodiments thereof. Those of ordinary skill in the art will appreciate that modifications and variations on the basic teachings of the present invention might be made without varying from the fundamental teachings thereof. Consequently, the scope of the present invention is to be determined from the claims, which follow.

What is claimed is:

1. A URL processing system, comprising:
   a first URL forwarding web server adapted to receive requests for first and second URLs and return first and second messages responsive to the first and second URL requests, the first and second URL requests each resolving to a first IP address of the first web server according to a domain name system;
   a file server accessible by the first URL forwarding web server, the file server adapted to store a plurality of files corresponding to a plurality of URLs, each of the plurality of files storing URL forwarding information for each corresponding URL, the URL forwarding information associating the plurality of URLs with a plurality of IP addresses so that the file server returns destination IP addresses different from IP addresses to which each corresponding URL resolves according to the domain name system, the file server respectively selecting first and second files from the plurality of files in response to the first URL forwarding web server receiving the first and second URL requests, the first file storing a first destination IP address of a first destination server and the second file storing a second destination IP address of a second destination server, the first URL forwarding web server returning the first destination IP address as at least a part of the first message in response to the first URL request and returning the second destination IP address as at least a part of the second message in response to the second URL request, responses to the first and second URL requests respectively served from the first and second destination servers; and
   a second web server associated with the file server, the second web server adapted to receive a request to alter the first destination IP address within the first file to a third destination IP address for a third destination server different from the first destination server, the first and the third destination IP addresses different from the IP address to which the first URL resolves according to the domain name system, so that the first URL forwarding web server returns the third destination IP address in response to the first URL request after the request to alter is completed wherein the request to alter is provided through a domain management interface having a process for authenticating a user's right to alter contents of the first file.

2. The URL processing system of claim 1, wherein a domain name server within the domain name system associates the first URL with the first IP address for the first URL forwarding web server after the request to alter is completed.

3. The URL processing system of claim 1, wherein the file server stores the plurality of files in a directory format organized according to names of the plurality of files, the names comprising URL data identifying the URLs designated for URL forwarding.

4. The URL processing system of claim 3, wherein the URL data comprise domain names and the directory organizes the plurality of files according to alphabetic ordering of the domain names.

5. The URL processing system of claim 3, wherein the plurality of files are stored in a common file space of an array of hard disks.

6. The URL processing system of claim 1, wherein the first file includes advertising information specifying whether advertising is to be added to the response to the first URL request, the first URL forwarding web server causing advertising to be added to the response to the first URL request according to the advertising information.

7. The URL processing system of claim 6, wherein the advertising is provided in a frame of a framed web page.

8. The URL processing system of claim 6, wherein advertising is selectively added or not added according to the advertising information.

9. The URL processing system of claim 1, wherein the first destination server returns the response to the first URL request without advertising in response to information in the first file.

10. The URL processing system of claim 1, wherein the domain management interface generates a display within a browser through which a user initiates URL forwarding for a URL in a process including validation of a user's credit card.

11. The URL processing system of claim 1, wherein the domain management interface interacts with a browser having an active domain name designated in the browser, wherein URL forwarding for the active domain name is selected through a hyperlink.

12. The URL processing system of claim 1, wherein the second web server is a registrar web server.

13. The URL processing system of claim 1, wherein when the second web server alters the first destination IP address within the first file no message is communicated to the domain name system.

14. The URL processing system of claim 13, wherein the first file includes advertising information specifying whether advertising is to be added to the response to the first URL request, the first destination server adding advertising to the response according to the advertising information.

15. The URL processing system of claim 13, wherein the domain management interface interacts with a browser having an active domain name designated in the browser, wherein URL forwarding to the first destination server is selected for the active domain name through a hyperlink.

16. The URL processing system of claim 13, wherein the second web server is a registrar web server.

17. The URL processing system of claim 1, wherein the response to the first URL request is a web page stored on the first destination server.

18. The URL processing system of claim 17, wherein the first file includes advertising information specifying whether advertising is to be added to a response to the first URL request, the first destination server adding advertising to the response according to the advertising information.

19. The URL processing system of claim 18, wherein the domain management interface interacts with a browser having an active domain name designated in the browser, wherein URL forwarding is selected through a hyperlink.

20. The URL processing system of claim 19, wherein the second web server is a registrar web server.

21. The URL processing system of claim 1, wherein the files stored in the file server are addressed by individual ones of the plurality of URLs and wherein the domain name system identifies the first IP address of the first URL forwarding web server for each of the plurality of URLs stored in the file server.

22. The URL processing system of claim 1, wherein a third file of the plurality of files is identified by a third URL in a third URL request and contains a fourth destination IP address of a fourth destination server, the first URL forwarding web server returning the fourth destination IP address as part of a message responsive to the third URL request, and wherein the domain name system identifies the first IP address of the first server for the third URL.

23. The URL processing system of claim 1, wherein the first URL request seeks content designated by the first URL and the first file identifies the first destination server as hosting the content sought by the first URL request.

24. The URL processing system of claim 1, wherein the first message responsive to the first URL request causes display of content from the first destination server on a client machine.

25. The URL processing system of claim 24, wherein the domain management interface operates with a browser and receives an indication of an active domain name designated by a user within the browser, wherein the domain management interface initiates a URL forwarding setup process in response to a user selecting URL forwarding through a hyperlink and wherein the domain management initiates a URL forwarding modification process to alter the first destination IP address in response to user input through the browser.

* * * * *